United States Patent [19]

LaBelle et al.

[11] 4,247,236

[45] Jan. 27, 1981

[54] BULKHEAD DOOR LOCKING ARRANGEMENT

[75] Inventors: Robert B. LaBelle, Spring Valley, N.Y.; James R. Neece, Trumbull, Conn.

[73] Assignee: General Foods Corporation, White Plains, N.Y.

[21] Appl. No.: 21,531

[22] Filed: Mar. 19, 1979

[51] Int. Cl.³ .................. B60P 7/14; B61D 45/00; B63B 25/24
[52] U.S. Cl. .................. 410/129; 410/139; 410/142
[58] Field of Search .............. 410/117, 118, 119, 121, 410/125, 126, 129, 130, 131, 132, 133, 134, 138, 139, 142

[56] References Cited

U.S. PATENT DOCUMENTS

| Re. 27,615 | 4/1973 | Brown et al. | 410/125 |
|---|---|---|---|
| 2,978,993 | 4/1961 | Hall | 410/129 |
| 3,112,712 | 12/1963 | Cisco | 410/139 |
| 3,168,055 | 2/1965 | Vander Hyde et al. | 410/134 |
| 3,280,761 | 10/1966 | Kostrema | 410/132 |
| 3,490,388 | 1/1970 | Lundrall et al. | 410/139 |
| 3,550,538 | 12/1970 | Geyer | 410/134 |

Primary Examiner—Howard Beltran

Attorney, Agent, or Firm—C. Garman Hubbard; Thomas V. Sullivan; Bruno P. Struzzi

[57] ABSTRACT

A locking arrangement for a bulkhead door in a freight transport vehicle in which locking plates are selectively positioned along tracks on each side of the vehicle floor, and are engaged by locking pins in the bulkhead door. A locking track is mounted in the transport vehicle floor along each side thereof, and extends along a substantial portion of the length of the vehicle. Each track consists of an elongated, rectangularly-shaped steel plate positioned to extend along a longitudinal side of the vehicle, and has a number of vertically-extending holes formed therein and spaced along its length. Each locking plate has a relatively short length in comparison to a locking track, and has several posts extending vertically downwardly from its bottom to engage the holes in a locking track. Each locking plate has a number of vertically-extending holes spaced along its length, with the number of holes per unit length in each plate being substantially greater than the number of holes per unit length in each locking track. The arrangement allows a locking plate to be selectively positioned along the length of a locking track at a location where a bulkhead door is to be placed. The bulkhead door is then vertically positioned in the vehicle, and vertically extensible pins on each side of the bulkhead door engage one of the holes in the locking plates on each side of the transport vehicle.

7 Claims, 11 Drawing Figures

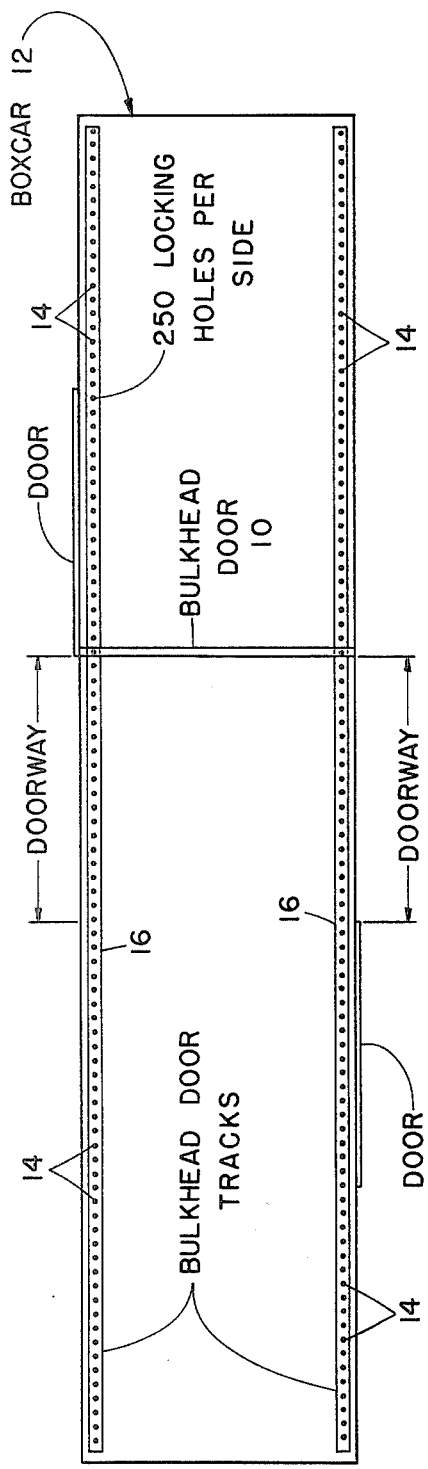
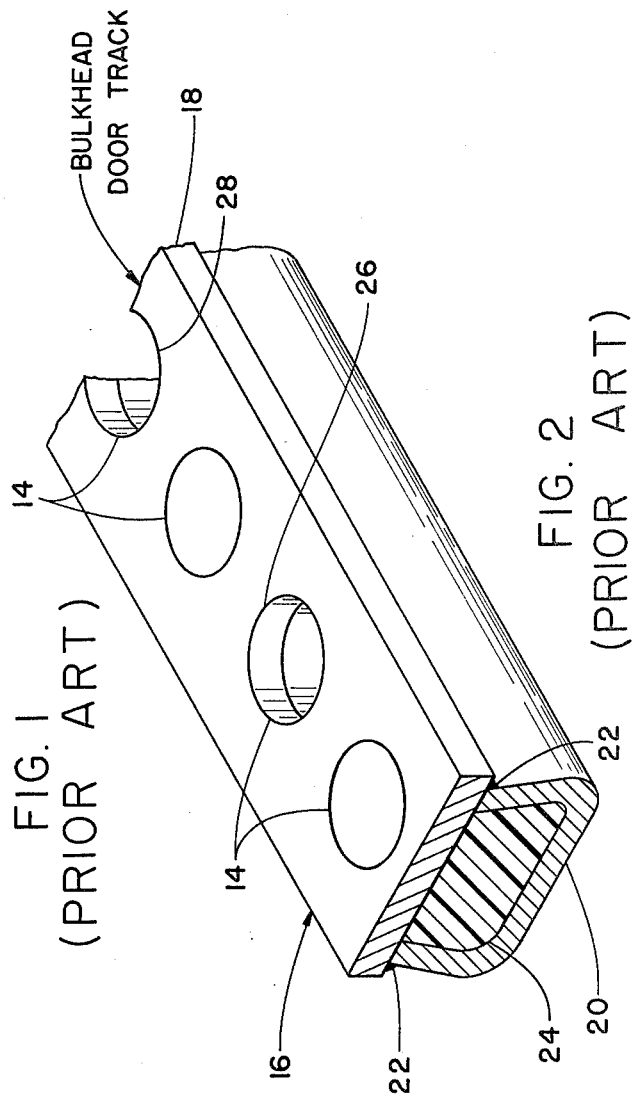
FIG. 1 (PRIOR ART)
FIG. 2 (PRIOR ART)

BULKHEAD DOOR LOCKING ARRANGEMENT

BACKGROUND OF THE INVENTION

1. Field of the Invention

The present invention relates, in general, to an arrangement for securing bulkhead doors employed in the compartmenting of cargo or bulk lading in a freight transport vehicle such as a railway freight car, a freight trailer, or the like. More particularly, the present invention relates to an improved locking arrangement for a bulkhead door in a railroad freight boxcar known as Palletized Shipping Program (PSP) freight car in which adjustably movable bulkhead doors are adapted to be locked in place relative to cargo or lading so as to prevent subsequent movement and damage thereto.

Palletized Shipping Program (PSP) railroad boxcars are frequently utilized in the shipment of bulk commodities, such as grain, cereals, and other types of comestibles. In view thereof, these vehicular carriers tend to be considered as mobile warehouses, and governmental regulations require that the carriers be of a design enabling the grain and other food products to be shipped in a clean and sanitary manner meeting prerequisite standards. Accordingly, a transport vehicle of this type should make provision to allow for the removal and cleaning of grains and other foodstuff residues which may serve as a harborage and breeding grounds for insects, vermin, and other pests commonly associated with food products of this nature. The transport, vehicle must be periodically cleaned or disinfected, and areas, such as hidden locations not readily accessible and which are susceptible to infestation, must be able to be effectively treated with insecticides. In prior art Palletized Shipping Program boxcars, the locking mechanisms for the movable bulkhead doors have generally been of two commonly employed designs.

2. Discussion of the Prior Art

In accordance with one prior art design, the bulkhead doors, usually two per vehicle or railroad boxcar, are locked into position against loaded cargo through the use of vertically extending lever-operated pins mounted in the doors which engage holes in bulkhead locking tracks located in and extending along each longitudinal side of the vehicle floor. A typical PSP boxcar is fifty feet in length and, in accordance with this prior art bulkhead locking arrangement, approximately 250 locking holes are formed in each locking track on each side of the boxcar, in effect, a total of about 500 holes for each boxcar. Each track includes a channel member having the locking holes spaced along its length and with the interior of the channel member being preferably filled with urethane foam to minimize cleaning and contamination problems with the track. In accordance with this approach, if a bulkhead door is to be locked in place using a particular set of locking holes, the urethane foam in those holes is removed, such as by drilling, to permit insertion of the door locking pins. With continued usage of the boxcar, those holes having the urethane foam removed therefrom cause cleaning and resultant infestation problems.

Another problem associated with this prior art approach is that the urethane foam presents an additional infestation problem in that insects and insect eggs tend to invade inner spaces where the foam meets surfaces of the floor plate or in cracks which occur in the foam. In view thereof, each track must be periodically completely stripped of its urethane foam, possibly several times each year, and then refoamed. An operation of this nature requires a partial disassembly of the PSP boxcar to obtain access to an open end of the track. The inside of the track is then blasted, as with a sandblasting technique, to remove the old contaminated urethane foam therefrom. Each track must be subsequently refilled with new urethane foam, and the transport vehicle reassembled; obviously a relatively time-consuming and expensive operation, particularly considering that each transport vehicle is not available for its primary purpose of transporting goods during this lengthy and cumbersome servicing operation.

In accordance with a second prior art design for PSP boxcar bulkhead door locking tracks, a recessed track having a series of raised pins is positioned so as to extend along each longitudinal side of the transport vehicle. A movable bulkhead door is then selectively positioned over appropriate raised pins on each side of the vehicle, thereby locking the door in place. Although each recessed track together with its series of pins is easier to clean than a vehicle constructed in accordance with the first approach employing urethane foam-filled tracks, the open tracks generally must extend the full length of the transport vehicle on each longitudinal side thereof, and the recessed areas tend to collect and trap residue such as grain and collected floor dirt, forming regions subject to insect infestation. It would be desirable to have an arrangement for locking bulkhead doors which is easily cleaned, as by vacuuming, and which may be effectively and easily treated with a minimum and safe application of insecticides.

Another disadvantage encountered in the prior art arrangements is that a damaged track must be repaired in a railroad service yard, with the attendant drawback that the vehicle is not available for freight transportation during the time interval required to effect the necessary repairs.

Brown, Jr., et al. U.S. Pat. No. Re. 27,615 discloses an arrangement for protecting lading or freight in a transport car in which the freight is secured in place by movable bulkhead doors. In this arrangement the bulkhead doors are provided with latching studs which cooperate with depressions in fixed members at the top and bottom of the car to secure the door in place against the cargo. Furthermore, the bulkhead doors are provided with inflatable cushions which may be expanded against the cargo to further assist in securing it relative to the transport vehicle.

Vander Hyde, et al U.S. Pat. No. 3,168,055 discloses an arrangement in which railroad cars are equipped with rigid bulkhead doors movably positioned on overhead tracks and latching at their top and bottom to lock the doors in place against the cargo. In this prior art arrangement, upper and lower latching pins project from the bulkhead door into latching openings formed periodically along the length of the track members to secure the door in place.

SUMMARY OF THE INVENTION

Accordingly, in order to eliminate or ameliorate the disadvantages encountered in the prior art, the present invention contemplates the provision of a locking arrangement for bulkhead doors in a transport vehicle in which the number of separate securing apertures or holes provided in the vehicle is substantially reduced, with a consequent reduction in the amount of time and effort required to clean the vehicle and treat it with insecticide. In one specific embodiment of the invention disclosed herein, only twenty-two holes are provided along both locking tracks on each side of the vehicle, which results in a substantial reduction in the amount of time and related costs to clean and treat the holes with insecticides (particularly considering that up to 500 holes or 100 feet of open track are provided in existing prior art arrangements). It is a specific object of the present invention to provide a locking arrangement for bulkhead doors which does not require periodic re-foaming of a track with its attendant disadvantages as described hereinabove.

Another object of the present invention is the provision of an arrangement of the type described wherein the potential for infestation by insects and other pests is greatly reduced, thereby also substantially reducing the danger of spoilage as a result of the infestation of grains and other food products shipped in the transport vehicle.

Yet another object of the present invention is to provide a locking arrangement for bulkhead doors in transport vehicles wherein damage to the door securing equipment may be easily repaired without the removal of the transport vehicle to a railroad service yard and from active service during the effectuation of repairs.

A further object of the present invention lies in the provision of an arrangement of the type described which may be installed in new railroad boxcars or retrofitted to existing PSP boxcars at a minimal cost.

More specifically, the present invention contemplates the provision of an improved locking arrangement for a bulkhead door in a freight transport vehicle, such as a railroad boxcar, in which at least one locking track extends along a portion of the longitudinal length of the vehicle at each side thereof and includes a plurality of engaging apertures or holes therein formed periodically along its length. A locking plate having several securing posts extending downwardly therefrom at a spacing complementary to that between the engaging holes on the locking track is adapted to be mounted on the track whereby the plate may be adjustably positioned at selective locations along the length of the locking track. The locking plate has additional locking holes formed therethrough and spaced along its length with the number of locking holes formed therein per unit length being substantially greater than the number of engaging holes per unit length in the locking track, thereby providing a large plurality of locking or engaging holes per unit length in the locking plate through which a bulkhead door may be secured to the locking track of the transport vehicle.

Additionally, the bulkhead door includes a securing means mounted along its edge which is complementary to the engaging means on the locking plate so that they may be secured relative to each other to thereby fixedly position the bulkhead door in the freight transport vehicle. Pursuant to a preferred embodiment, the securing means for the bulkhead door includes a longitudinally extensible vertical locking pin which is adapted to engage at its lower end in one of the spaced apertures in the locking plate. Moreover, in accordance with the teachings set forth herein, the novel and inventive locking arrangement is designed for particular use in a railroad boxcar of the PSP type. Generally, each transport vehicle is equipped with two locking tracks, one each positioned along each longitudinal side thereof, and at least one locking plate is provided for each track. The locking track extends along a substantial portion of the length of the vehicle, but preferably not for the full length thereof, and is centrally positioned relative to the opposite end of the vehicle. Furthermore, in accordance with a preferred embodiment, each locking track comprises an elongated, rectangularly-shaped steel plate constructed so as to be set into the transport vehicle with the upper surface flush with its floor level, the locking plate being mounted thereon and elevated relative to the vehicle floor.

BRIEF DESCRIPTION OF THE DRAWINGS

The foregoing and other objects and advantages of a novel bulkhead door locking arrangement which is constructed pursuant to the present invention may be more readily understood by one skilled in the art, reference being made to the following detailed description of preferred embodiments thereof, taken in conjunction with the accompanying drawings wherein like reference numerals are utilized to refer to similar elements throughout the several views; and in which:

FIG. 1 is a schematic plan view of one prior art locking arrangement for bulkhead doors;

FIG. 2 is an enlarged, partially sectional view of a segment of a prior art bulkhead door locking track used in the arrangement of FIG. 1;

DETAILED DESCRIPTION OF THE DRAWINGS

Figure 3:
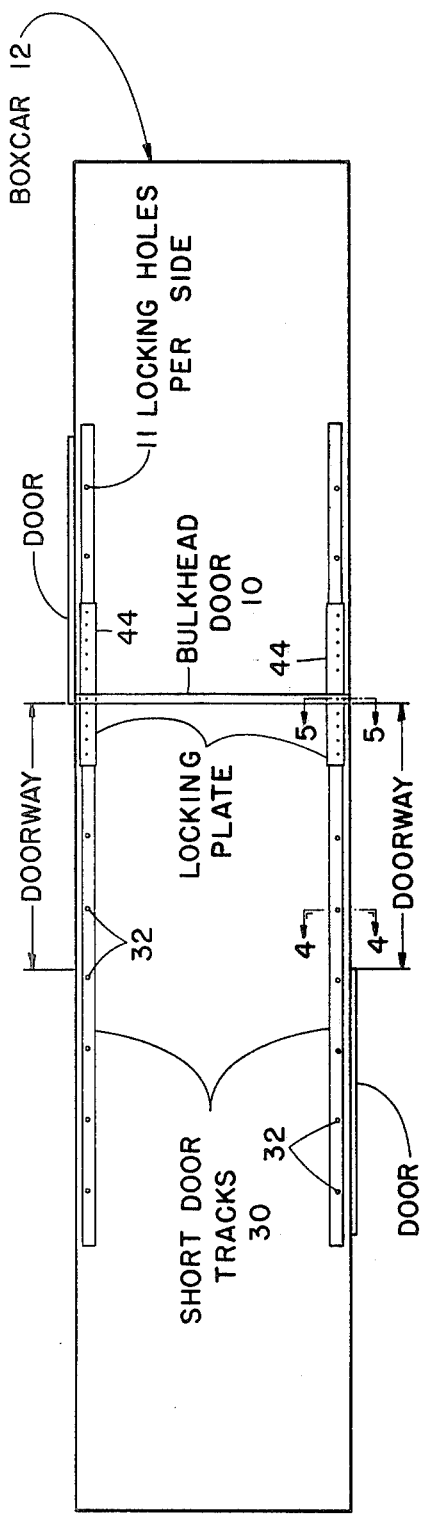
FIG. 3 illustrates a plan view of one preferred embodiment of a bulkhead door locking arrangement constructed pursuant to the present invention.
Figure 5:
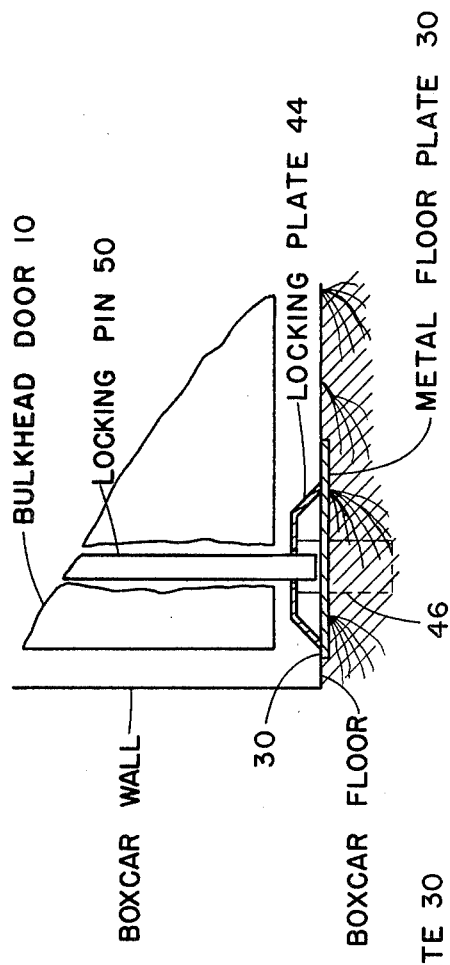
FIG. 5 is an enlarged sectional view taken along line 5—5 in FIG. 3 illustrating details of construction of a locking plate mounted on the locking track and with a locking pin in a bulkhead door engaging an aperture formed in the locking plate.

Referring now in detail to FIG. 1, there is shown a schematic plan view of a prior art arrangement for locking a bulkhead door 10 in a boxcar 12 of the Palletized Shipping Program (PSP) type. In this arrangement the bulkhead door is locked into position against loaded cargo by the use of vertically-slidable lever-operated pins (not shown) mounted in the door which selectively engage holes 14 in bulkhead tracks 16 which are located in the floor extending along each side of the boxcar. A typical PSP boxcar is 50 feet in length, and in one standard arrangement approximately 250 locking holes 14 are provided in each track 16 extending along each side of the boxcar 12. As illustrated in further detail in FIG. 2, each track 16 includes a flat, rectangularly-shaped steel plate 18 having a large number of vertically-extending holes 14 formed therein and spaced along its length, the top surface of the plate 18 being normally coplanar with the floor of the boxcar. The bottom portion of the track 16 is formed by a channel member 20 having a U-shape in cross-section, which is fastened to the plate member 18 by a plurality of welds 22 extending along the length of the track structure. The interior of each channel member and the holes 14 may be filled with a suitable dense urethane foam 24 to minimize cleaning and contamination problems with the track. If a particular locking hole, such as hole 26, is to be utilized to secure a bulkhead door in place, the urethane foam in that hole is removed, as by drilling. With continued usage of the boxcar, additional holes 28 will also have urethane foam removed therefrom, thereby resulting in greater cleaning and infestation problems with the track.

Figure 4:
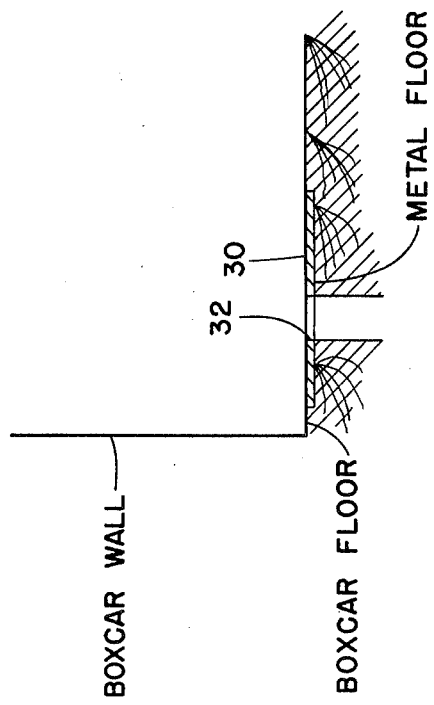
FIG. 4 is an enlarged sectional view taken along line 4—4 in FIG. 3, illustrating further details of the locking track.
Figures 10, 11:
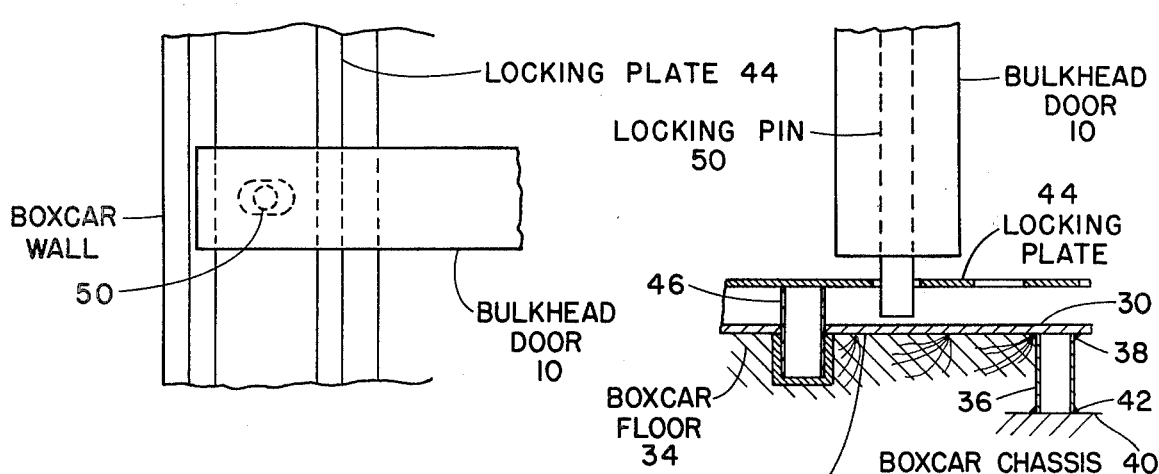
FIGS. 10 and 11 are, respectively, plan and elevational fragmentary views showing the fastening of the bulkhead door to the locking plate and locking track.

FIG. 3 illustrates a plan view of one preferred embodiment of a bulkhead door securing arrangement in which bulkhead door locking tracks 30 extend along the length, and at each side, of a freight transport vehicle 12, such as a boxcar. Each track includes a plurality of engaging means, in the form of vertically-extending holes or apertures 32, spaced along the length thereof. In accordance with one preferred embodiment, each track is a rectangularly-shaped plate installed in the floor of the boxcar with the upper surface being flush with the floor, is 20 feet long, and contains eleven $2\frac{1}{4}$ inch diameter engaging holes 32 formed therein spaced along the length of the track. The floor 34 beneath each vertically-extending hole 32 is also bored with a $2\frac{1}{4}$ inch diameter hole, as illustrated in FIG. 4, so as to form an extension of each hole 32. Each locking track 30 is secured periodically along its length by a section of hollow pipe or a solid post 36, illustrated in FIG. 11, which is welded at 38 to the bottom of the track member, and extends through the boxcar floor 34 to the boxcar chassis 40, to which it is also suitably secured as by a weld 42 to thereby form a permanent solidly anchored structure.

Figure 6:
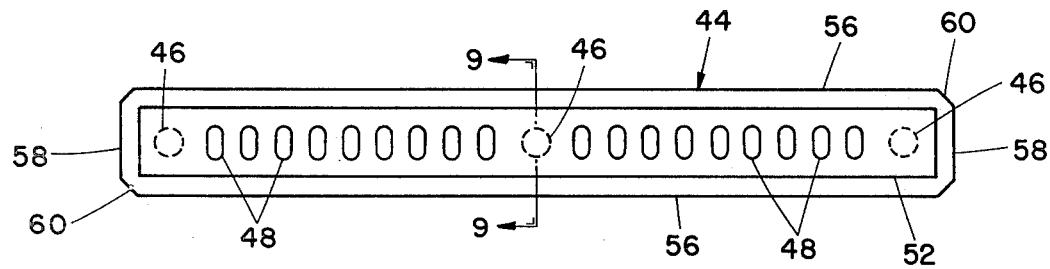
FIG. 6 illustrates a plan view of one embodiment of a locking plate constructed pursuant to the present invention.
Figure 7:
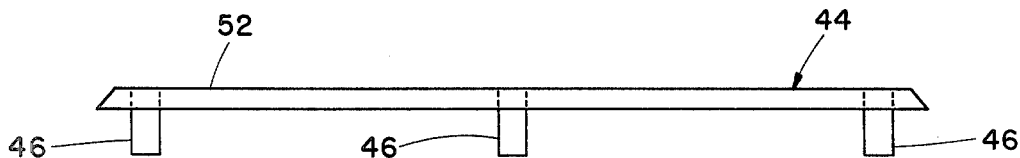
FIG. 7 and 8 illustrate, respectively, side and end views of the locking plate shown in FIG. 6, with FIG. 8 being in an enlarged scale.
Figures 8, 9:
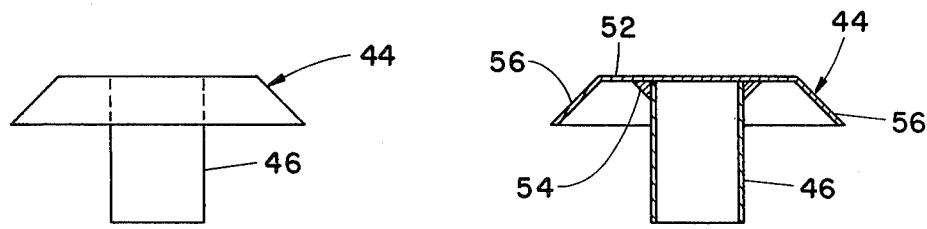
FIG. 9 is an enlarged sectional view taken along line 9—9 in FIG. 6, showing further details of construction of the locking plate.

The arrangement described thus far provides a securing arrangement for a bulkhead door locking plate 44 which is of a relatively short length in comparison to the locking track 30 and has several short cylindrical posts 46 extending downwardly therefrom spaced for cooperative engagement with the holes 32 in the locking track 30. The vertically-extending posts 46 provide a securing means for the locking plate 44 which is complementary to the locking holes 32 in tracks 30 such that, for example, three vertically-extending cylindrical posts 46 may be selectively engaged in three adjacent locking holes 32 in track 30. The locking plate 44 has a plurality of bulkhead door engaging means in the form of vertically-extending, elongated holes 48 formed to be spaced periodically along its length, with the number of holes 48 per unit length in the locking plate being substantially larger than the number of holes 32 per unit length in the locking track 30. The overall arrangement is such that the considerably larger number of engaging holes in locking plate 44 provides for a greater number of engaging means per unit length to which a bulkhead door may be secured. FIG. 6 graphically illustrates that for the three engaging apertures spaced along the length of track 30, locking plate 44 provides for eighteen holes 48 spaced along its length. In accordance with the present disclosure, each bulkhead door 12 may be constructed pursuant to concepts well known in the state of the art, and includes vertically-extensible rods or pins 50 adapted to engage locking holes 48.

Each locking plate 44 is constructed of a rectangularly-shaped, flat plate 52 to which the vertically-extending posts 46 are attached, such as by suitable welds 54. Downwardly depending and outwardly tapered side skirts 56 extend longitudinally along each side of the plate 52 and may be formed integrally therewith, as by pressing or stamping from a flat steel plate. Tapered end plates 58 are provided at each end of the plate 52, and may also be formed integrally therewith. The tapered side and end plates 56 and 58 provide a suitable slope or ramp leading to the plate 52 over which freight may be moved and freighthandling machinery, such as forklifts, may travel without tipping. Each of the four corners 60 of the locking plate 44 may be suitably shaped to eliminate sharp edges therefrom. All of the components described thus far, including the locking tracks 30 and the various components of each locking plate 44 may be constructed of a suitable steel.

In a retrofitting application of the structure of the present invention to existing bulkhead doors, the locking pins 50 in each bulkhead door may be shortened by approximately one inch, as the pins need no longer extend through the floor surface. In a typical retrofitting operation, no other modifications to the bulkhead doors would be necessary, unless the doors have less than a two-inch clearance to the floor, in which case the doors must be correspondingly shortened. In retrofitting the equipment described herein for use in existing PSP boxcars, the old door tracks in the floor, as illustrated in FIG. 1 hereof, must be removed, new flooring installed, and the new bulkhead door locking tracks mounted in the new floor.

In accordance with the present invention, it is sufficient to provide a total of twenty-two locking holes or apertures each having a diameter of $2\frac{1}{4}$ inches, eleven holes in each track 30, along both sides of a railway boxcar. The result of this is to provide for fewer and larger (and therefore more easily cleanable) locking holes in the overall securing arrangement in contrast with the prior art.

As illustrated in FIG. 3, in most instances the door tracks 30 need not extend the full length of the boxcar 12, but instead need extend within the vehicle at which there is a substantial probability of a need for the positioning of a bulkhead door.

In usage or operation of the equipment described thus far, a transport vehicle is loaded except for the final two stacks in each end by the doorway. The locking plates are then placed in locking holes in the locking tracks approximately two feet from the ends of the previously loaded freight. The final stacks are then loaded, the bulkheads are placed in position against the freight, and the locking pins secured in the holes in the locking plate. Locking plates may also be used to secure bulkheads in place in empty, in-transit boxcars to prevent door movement and resultant damage thereto.

The present invention has been described with respect to a locking track having a plurality of engaging means in the form of locking apertures formed periodically therein. In an alternative embodiment, the locking track may be provided with other suitable engaging means, as for instance suitable pins extending therefrom, in which case the complementary securing means on the locking plates would be suitably spaced apertures. Likewise, the locking arrangement between the locking plate and bulkhead door may also take other suitable forms other than those described in detail herein. The locking tracks may also be constructed with a fewer or greater number of locking holes, and may be of various lengths with respect to the vehicle. Also, in some arrangements, the bulkhead doors may be split vertically so as to constitute two side-by-side half doors, in which case two additional longitudinally-extending locking tracks may be constructed near the center of the vehicle to accommodate for the split arrangement of the bulkhead doors.

While several embodiments and variations of the present invention have been described in detail herein, it will be apparent that the teachings of the present invention will encompass many other structures within the purview of one of ordinary skill in the art.

What is claimed is:

1. A locking arrangement for securing a bulkhead door in a freight transport vehicle, comprising:
    (a) at least one locking track extending along and securely anchored to an interior surface of at least a portion of the length of the freight transport vehicle and including a plurality of evenly spaced engaging means along its length to serve as a lock; and
    (b) at least one locking plate having disposed along one side thereof a plurality of perpendicularly projecting and integral securing means spaced correspondingly and shaped complementally to the engaging means on said track for engaging the same, said plate being adapted to be selectively positioned along the length of and overlying said locking track at a selected locking location with said securing and engaging means being in an interengaging condition to thereby restrain longitudinal movement of said plate along said locking track, said locking plate having a plurality of engaging means formed therein periodically along its length in the same directional orientation as said first mentioned engaging means with the number of engaging means per unit length in the locking plate being substantially larger than the number of engaging means per unit length in said locking track, the engaging means on the locking plate each defining a separate locking location and being adapted to interengage with securing means perpendicularly projectable relative thereto from the bulkhead door disposed on the opposite side thereof for locking the bulkhead door relative to the locking plate and thereby longitudinally securing the position of the bulkhead door relative to the freight transport vehicle in a locking location selected from a plurality thereof larger in number then the number of engaging means spaced along said locking track.

2. A locking arrangement as claimed in claim 1, said engaging means on the locking track including a plurality of through apertures spaced along the length of the track, said securing means on the locking plate including a plurality of depending posts spaced along its length in the same spacing as the apertures formed in the locking track so as to enable the posts of the locking plate to selectively engage the apertures in the locking track, said plurality of engaging means on the locking plate including a plurality of through apertures spaced along its length, said securing means on the bulkhead door including a longitudinally extensible locking rod adapted to engage into one of the spaced apertures in said lockking plate.

3. A locking arrangement as claimed in claim 1 or 2, said transport vehicle being a railroad boxcar.

4. A locking arrangement as claimed in claim 1 or 2, said transport vehicle including two of said locking tracks, one each positioned to extend along the length of the vehicle on each side thereof, and at least one said locking plate being mounted on each said locking track.

5. A locking arrangement as claimed in claim 4, each said locking track extending along a portion of the length of the vehicle but being shorter than said vehicle, and being centrally positioned from the opposite ends of the vehicle.

6. A locking arrangement as claimed in claim 1 or 2, each said locking track comprising an elongated, rectangularly-shaped flat steel plate mounted in the floor of the transport vehicle and having the upper surface thereof coplanar with said floor.

7. A locking arrangement as claimed in claim 6, each said locking plate being elevated relative to the vehicle floor and including tapered depending side walls supported on the locking track.

* * * * *